United States Patent
Lieberman et al.

(10) Patent No.: US 10,152,246 B1
(45) Date of Patent: Dec. 11, 2018

(54) APPLICATION AWARE AMQP DURABLE MESSAGES BACKUP AND RESTORE

(71) Applicant: EMC Corporation, Hopkinton, MA (US)

(72) Inventors: Amit Lieberman, Raanana (IL); Assaf Natanzon, Tel Aviv (IL); Jehuda Shemer, Kfar Saba (IL); Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 158 days.

(21) Appl. No.: 15/083,209

(22) Filed: Mar. 28, 2016

(51) Int. Cl.
*G06F 3/00* (2006.01)
*G06F 3/06* (2006.01)

(52) U.S. Cl.
CPC ............ *G06F 3/0619* (2013.01); *G06F 3/065* (2013.01); *G06F 3/0683* (2013.01)

(58) Field of Classification Search
CPC .... G06F 3/0619; G06F 3/065; G06F 11/2074; G06F 3/0683; G06F 3/067; G06F 11/1456
See application file for complete search history.

(56) References Cited

U.S. PATENT DOCUMENTS

| | | | | |
|---|---|---|---|---|
| 7,139,973 B1* | 11/2006 | Kirkwood | ........... | G06F 17/2229 707/E17.12 |
| 7,788,224 B2* | 8/2010 | Fleck | ................ | G06F 17/30581 707/610 |
| 8,296,475 B2* | 10/2012 | Kottomtharayil | ........................... | G06F 17/30067 710/15 |
| 8,301,595 B2* | 10/2012 | Megginson | ....... | G06F 17/30578 707/622 |
| 2004/0215998 A1* | 10/2004 | Buxton | ............... | G06F 11/1474 714/2 |
| 2007/0088970 A1* | 4/2007 | Buxton | ............... | G06F 11/1471 714/2 |
| 2010/0077160 A1* | 3/2010 | Liu | ....................... | G06F 3/0482 711/162 |
| 2011/0145320 A1* | 6/2011 | Megginson | ....... | G06F 17/30569 709/203 |
| 2014/0189432 A1* | 7/2014 | Gokhale | ........... | G06F 17/30289 714/41 |

OTHER PUBLICATIONS

Budhiraja, Navin, et al. "The primary-backup approach." Distributed systems 2 (1993): 199-216.*
Junqueira, Flavio P., Benjamin C. Reed, and Marco Serafini. "Zab: High-performance broadcast for primary-backup systems." Dependable Systems & Networks (DSN), 2011 IEEE/IFIP 41st International Conference on. IEEE, 2011.*

* cited by examiner

*Primary Examiner* — Francisco A Grullon
(74) *Attorney, Agent, or Firm* — Womble Bond Dickinson (US) LLP

(57) ABSTRACT

According to one embodiment, a first message is received from a first application executed by a processor, the first message to be sent to a second application. A backup agent transmits the first message to a backup storage system that is associated with the first application. The backup agent forwards the first message to a first messaging application instance of a messaging sub-system associated with the first application. The messaging sub-system is to send the first message to a second messaging application instance of the messaging sub-system associated with the second application using a predetermined messaging protocol.

24 Claims, 6 Drawing Sheets

| Message ID | State | Sender | Receiver | Queue | Others |
|---|---|---|---|---|---|
| Message 1 | ... | ... | ... | ... | ... |
| Message 2 | ... | ... | ... | ... | ... |
| Message 3 | ... | ... | ... | ... | ... |
| ... 301 | ... 302 | ... 303 | ... 304 | ... 305 | ... 306 |

APPLICATION AWARE AMQP DURABLE MESSAGES BACKUP AND RESTORE

FIELD OF THE INVENTION

Embodiments of the present invention relate generally to data storage systems. More particularly, embodiments of the invention relate to application aware AMQP messages backup and restore.

BACKGROUND

In modern distributed applications, communicating between application services via a messaging system is an efficient and highly adopted pattern. Messaging software implementing the standard application programming interface (API) such as advanced message queuing protocol AMQP (e.g., RabbitMQ™) is widely used by business critical applications in order to transport business information asynchronously. Since the messaging has become a critical part of the dataflow in those critical applications, messaging introduced durability features allowing definition of queues as "durable" meaning that the queue contents are preserved even if the messaging software breaks and restarts. As for high availability and fault tolerance, mature messaging software offers replication between multiple nodes. While both features described above create an enterprise mature solution, there is a gap in the use case of business continuity.

Business critical applications requires being able to restore the entire application state to a previous point in time in case of data corruption, bugs or internal auditing. Messaging stores part of the application state as much as a database or any other persistent services. While two features above (e.g., high availability, durable messages) solve some of the business requirements, being able to restore the full application state is missing. Conventional systems utilize scripts for backup of messages. However, such message backups are not consistent, since the messaging software is not built with the backup use case in mind, the scripts might miss messages, acknowledgments or miss inter cluster inconsistency and failures. Since the application is consistent of multiple data services (e.g. a database, durable messages) there is no orchestration in the restore procedure to support a full restore of an application to its previous state.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating an example of a backup catalog of messages according to one embodiment of the invention.

DETAILED DESCRIPTION

Figure 1:
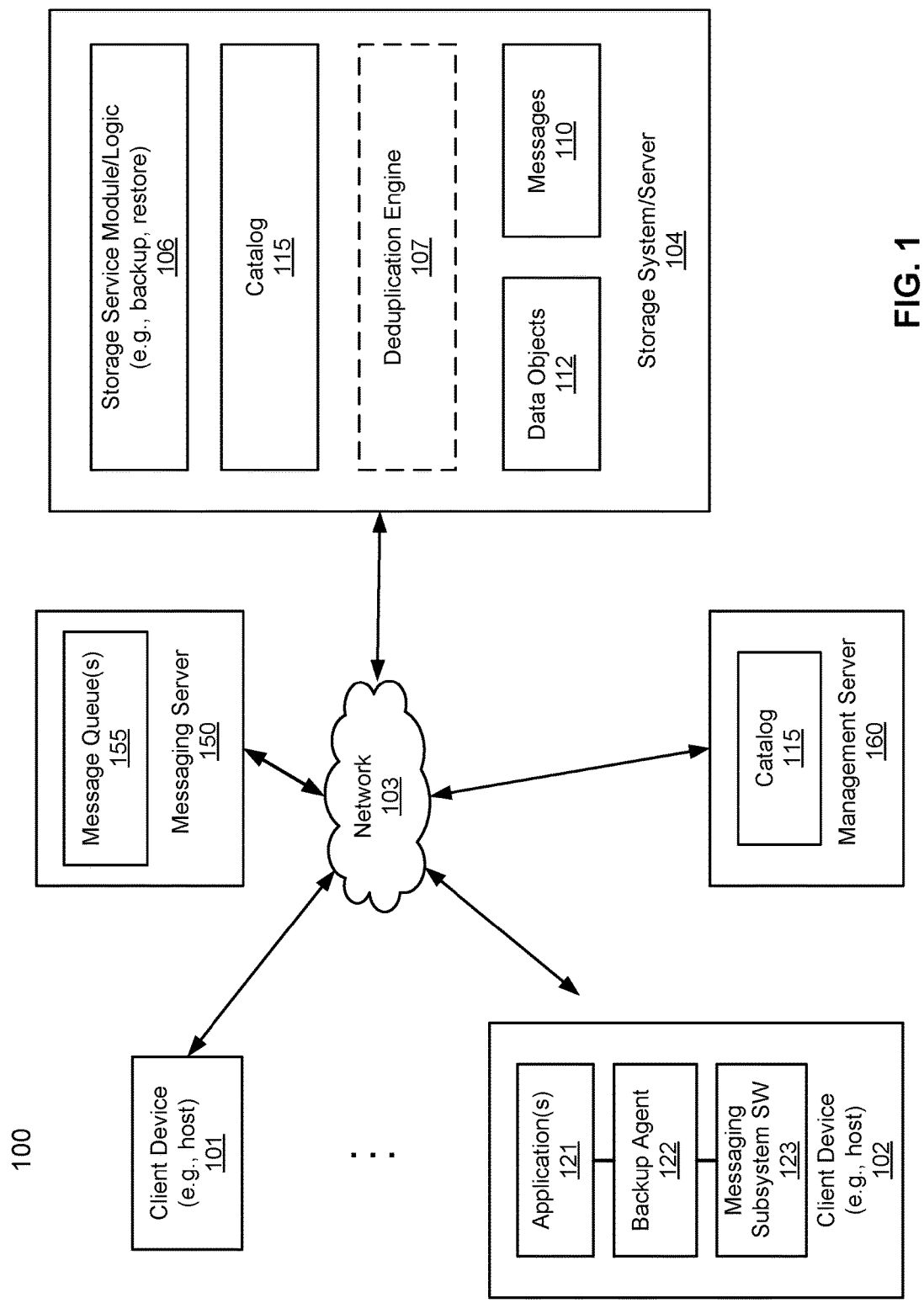
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a backup functionality is integrated at an application level to back up application states for applications supporting messaging software implementing messaging protocols, such as AMQP. It integrates the messaging backup at the application level, hence it supports backing up and restoring consistent application state. Instead of backing up the messages from the messaging software, according to one embodiment, the system provides an AMQP protocol endpoint that implements messaging. While the application sends the message to the messaging software, a backup agent intercepts and sends the message to a backup storage and then forwards the message to the underlying messaging software or subsystem. Since the nature of messaging is asynchronous, the latency involved is not expected to be significant and can be efficient by supporting asynchronous acknowledgement configuration.

In one embodiment, once the message has been acknowledged, it marks that in a metadata store to indicate that the message has been read by the intended receiver and delegates the acknowledgement to the underlying messaging software. As part of the configuration, clients can register specific queues to tenants and or applications, this way the system will correlate each message to a specific tenant/application. When a user would like to restore an application to its state in a certain point in time, the system will expose an API for restore to a specific point in time. All messages that were available for this tenant/application at the specific point in time will be restored. That is, receivers will start receiving the historical messages automatically once restore was successful. The restore operation can, if required, be orchestrated with multi data service restore implementing transactional restore API. The restore software can prepare restore (pauses all active messages being delivered to the current tenant/application), restore to a point in time of all messages related to the requested tenant/application, and commit/rollback.

According to one embodiment, when a message is received from a first application hosted in a first data processing system (e.g., storage system) to be sent to a message receiver (e.g., a second application) using a messaging protocol, a backup agent (e.g., operating as a proxy or plugin) intercepts the message. The backup agent transmits the message to a predetermined backup storage system to back up the message. Thereafter, the backup agent forwards the message to the underlying messaging subsystem, where the underlying messaging subsystem transmits the message to the intended message receiver using a proper messaging protocol (e.g. AMQP). In addition, the backup agent may transmit the metadata surrounding the backed-up message to a centralized management server that maintains a catalog to record a backup event associated with the backup of the message, including a timestamp associated with the transmission of the message, etc. Alternatively, the backup agent may host a local copy of the catalog. When an acknowledgement of the message is received from the message receiver, an entry of the catalog corresponding to the message is updated to indicate that the message has been read. The catalog can be utilized subsequently to restore messages that have been backed up at different point in time.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof) to provide storage services (e.g., backup, restore services) to data (e.g., data objects 112) stored in one or more storage units or devices (not shown). Storage service engine 106 may represent any storage service related components configured or adapted to provide storage services (e.g., storage as a service) to a variety of clients using any of the access protocols set forth above. For example, storage service engine 106 may include backup logic and restore logic (not shown). The backup logic is configured to receive and back up data from a client (e.g., clients 101-102) and to store the backup data in a persistent storage device (not shown). The restore logic is configured to retrieve and restore backup data from a storage device back to a client (e.g., clients 101-102).

The storage units storing data 112 may be implemented locally (e.g., single node operating environment) or remotely (e.g., multi-node operating environment) via interconnect, which may be a bus and/or a network (e.g., a storage network or a network similar to network 103). The storage units may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of the storage units may be located locally or remotely accessible over a network.

The data stored in server 104 may be deduplicated by deduplication logic or engine 107 and stored in a form of deduplicated data segments. In response to a data file to be stored in the storage units, according to one embodiment, deduplication logic 107 is configured to segment the data file into multiple segments (also referred to as chunks) according to a variety of segmentation policies or rules. The deduplication logic 107 may choose not to store a segment in a storage unit if the segment has been previously stored in the storage unit. In the event that the deduplication logic 107 chooses not to store the segment in the storage unit, it stores metadata enabling the reconstruction of the file using the previously stored segment. As a result, segments of data files are stored in a deduplicated manner. The metadata may be stored in at least some of the storage units, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

According to one embodiment, in addition to storing application data such as data objects 112 from clients 101-102, storage system 104 further stores messages 110 that are backed up from clients 101-102. Storage system 104 may further maintain catalog 115 storing information or metadata describing backup events associated with messages 110, such that a particular one of messages 110 backed up at a particular point in time can be restored. Alternatively, catalog 115 may be centralized maintained in management server 160. A user can access a user interface (e.g., Web interface, API, or CLI) provided by management server 160 to specify or select any one or more of messages 110 at a point in time to be restored.

In one embodiment, clients 101-102 may be part of a platform as a service (PaaS) system, where clients 101-102 may be PaaS nodes of a PaaS system. PaaS refers to a category of cloud computing services that provides a platform allowing customers to develop, run, and manage applications without the complexity of building and maintaining the infrastructure typically associated with developing and launching an application. PaaS can be delivered in two ways: as a public cloud service from a provider, where the consumer controls software deployment and configuration settings, and the provider provides the networks, servers, storage and other services to host the consumer's application; or as software installed in private data centers or public infrastructure as a service and managed by internal IT departments.

Referring back to FIG. 1, according to one embodiment, each of clients 101-102, in this example, client 102, includes or hosts one or more applications 121, backup agent 122, and messaging subsystem software 123 (also referred to as a messaging client or messaging application instance). Note that client device 101 may have a similar or the same architecture as of client device 102. Application 121 can be any kind of application software, such as, for example, database software applications. Application 121 may be hosted in a virtual machine (VM) that has been configured with a particular operating environment. Backup agent 122 can be operating as a plugin or daemon between application 121 and underlying messaging subsystem 123 (e.g., intermediate layer). Messaging subsystem software 123 may be any kind of messaging systems that are compatible with the AMQP (e.g., RabbitMQ™). Messaging subsystem software 123 may communicate with centralized messaging server 150, where messaging server 150 maintains one or more message queues 155 for storing messages received from clients 101-102 (e.g. multi-tenancy configuration). Messaging server 150 is responsible for storing messages received from senders in queues 155 and delivering messages to receivers.

Backup agent 122 is responsible for backing up messages sent and/or received by application 121 to backup storage system 104 and updating catalog 115 accordingly. According to one embodiment, when a message is received from application 121 to be sent to a message receiver (e.g., an application hosted in client 101) using a messaging protocol (e.g. AMQP), backup agent 122 intercepts the message. The backup agent 122 transmits the message to a predetermined backup storage system to back up the message, in this example, backup storage system 104. Thereafter, the backup agent 122 then forwards the message to the underlying messaging subsystem 123. The underlying message subsystem software 123 transmits the message to the intended message receiver using the proper messaging protocol. For example, messaging subsystem software 123 transmits the message to messaging server 150 to be queued in message queue 155. Messaging server 150 then notifies the intended receiver, in this example, client 102, that a new message has arrived. The intended message receiver then can retrieve the message from queue 155 of messaging server 150, which will send an acknowledgement back to the sender (e.g., client 101). Alternatively, messaging subsystem 123 may maintains its own message queue 155 without involving messaging server 150.

In addition, the backup agent 122 may transmit the metadata surrounding the backed-up message to centralized management server 160 that maintains catalog 115 to record a backup event associated with the backup of the message, including a timestamp associated with the transmission of the message, etc. Alternatively, backup agent 122 may maintain a local copy of the catalog. When an acknowledgement of the message is received from the message receiver, for example, via messaging server 150, an entry of the catalog 115 corresponding to the message is updated to indicate that the message has been read. The catalog 115 can be utilized subsequently to restore messages that have been backed up at a different point in time.

Typically in a conventional system, when a backup request is received to back up application 121, a snapshot of application 121, including its associated data, is captured. The snapshot is then backed up to storage system 104, which may also be performed by backup agent 122. However, a message sent by application 121 right before the snapshot taken may or may not be captured, since the message may be stored in message queue 155. The snapshot may not be able to capture that message. In one embodiment, by backing up messages to storage system 104 and recording the corresponding backup event of the messages in catalog 115, when the snapshot is subsequently restored, the message associated with the snapshot may also be restored. The relationship between the snapshot and the backup messages may also be indicated in catalog 115, such that when the snapshot is restored, the associated message(s) may also be restored. For example, the message(s) may be restored at least back to backup agent 122 and/or message queue 155, such that backup agent 122 can resend the messages to simulate the operating environment at the point in time. In one embodiment, if a particular message has been read by the corresponding message receiver, that particular message will not be restored since the message has been delivered, which may be indicated in a corresponding message event entry of catalog 115.

Figure 2:
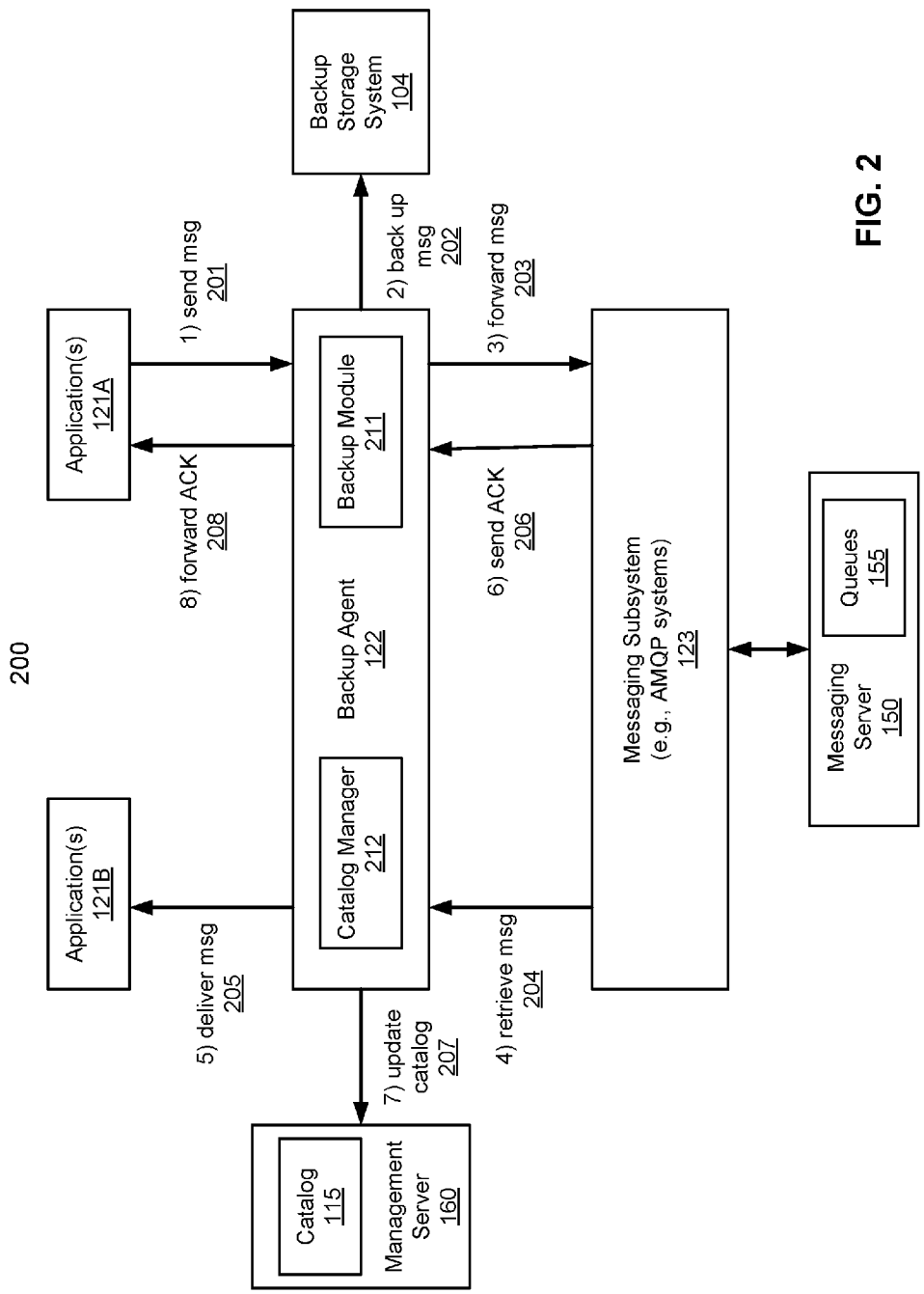
FIG. 2 is a block diagram illustrating an architecture of a message backup system according to one embodiment of the invention.

FIG. 2 is a block diagram illustrating an architecture of a message backup system according to one embodiment of the invention. System 200 may be implemented as part of FIG. 1. Referring to FIG. 2, system 200 represents a logical architecture involved in two systems, i.e., a sender system and a receiver system. As described, each of a sender system (e.g., host device 102) and a receiver system (e.g., host device 101) may have the same or similar system architecture. In this example, sender application 121A is associated with a sender system while receiver application 121B is associated with a receiver system. Each of the sender system and the receiver system will host an instance of backup agent 122 and messaging subsystem 123 therein.

In one embodiment, when sender application 121A sends a message to receiver application 121B via path 201, the message is intercepted by backup agent 122 transparently. Backup module 211 of backup agent 122 sends the message to backup storage system 104 via path 202. Backup module 211 then forwards the message to underlying messaging subsystem 123 (e.g., a corresponding messaging client or messaging application instance associated with application 121A) via path 203. Messaging subsystem 123 then delivers the message to receiver application 121B via paths 204-205. Messaging subsystem 123 associated with receiver application 121B (e.g., a corresponding messaging client or messaging application instance associated with application 121B) then sends an acknowledgement to sender application 121A via path 206, which is intercepted by backup agent 122. In response to the acknowledgement, catalog manager 212 of backup agent 122 associated with sender application 121A updates catalog 115, which may be maintained locally or remotely in a centralized backup management server. Thereafter, the acknowledgement is delivered to sender application 121A via path 208. All of the backup applications described above are transparent to applications 121A-121B.

FIG. 3 is a block diagram illustrating an example of a backup catalog of messages according to one embodiment of the invention. Referring to FIG. 3, catalog 300 may be implemented as part of catalog 115 described above. In this embodiment, catalog 300 includes multiple entries, each entry representing a particular backup event of a particular message. In this example, the entries may be indexed based on a message ID 301, which may be based on a timestamp of the backup event. Each entry may further identify state of the message 302, sender of the message 303, receiver of the message 304, queue ID identifying a queue storing the message, and other information 306. State of the message 302 may store an indicator indicating whether the message has been read by receiver 304, which may be updated in response to an acknowledgement received from receiver 304. Note that the format or layout of catalog 300 is described and shown for the purpose of illustration only. Catalog 300 may be indexed based on sender ID 303 or receiver ID 304. Alternatively, each sender or receiver may have its own catalog storing all events associated with the messages sent or received.

Figure 4:
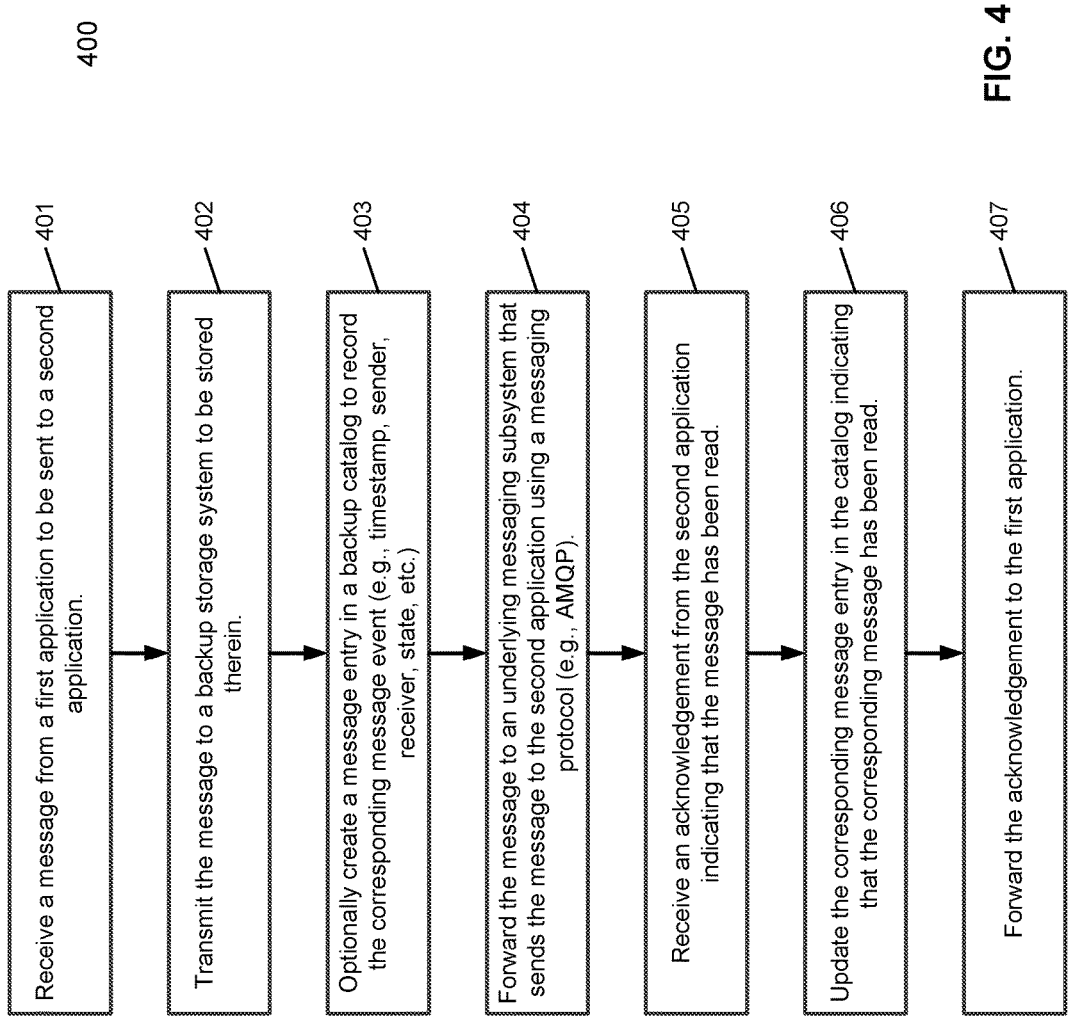
FIG. 4 is a flow diagram illustrating a process for backing up data according to one embodiment of the invention.

FIG. 4 is a flow diagram illustrating a process for backing up data according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by backup agent 122 of FIG. 1. Referring to FIG. 4, at block 401, processing logic receives a message from a first application (e.g., sender application) to be sent to a second application (e.g., receiver application). At block 402, processing logic transmits the message to a backup storage system to be stored therein. Such backup operation is transparent to the first application and/or the second application.

At block 403, processing logic optionally updates a backup catalog, for example, to create a new entry representing the backup event of the message at the point in time, including storing a timestamp of the message. At block 404, processing logic forwards the message to the underlying messaging subsystem. The messaging subsystem transmits the message to the second application using a predetermined messaging protocol, such as, for example, AMQP. Subsequently when the second application accesses the message, at block 405, an acknowledgement is received. At block 406, processing logic updates an entry corresponding to the message in the backup catalog to indicate that the message has been accessed. At block 407, the acknowledgement is then delivered to the first application.

Figure 5:
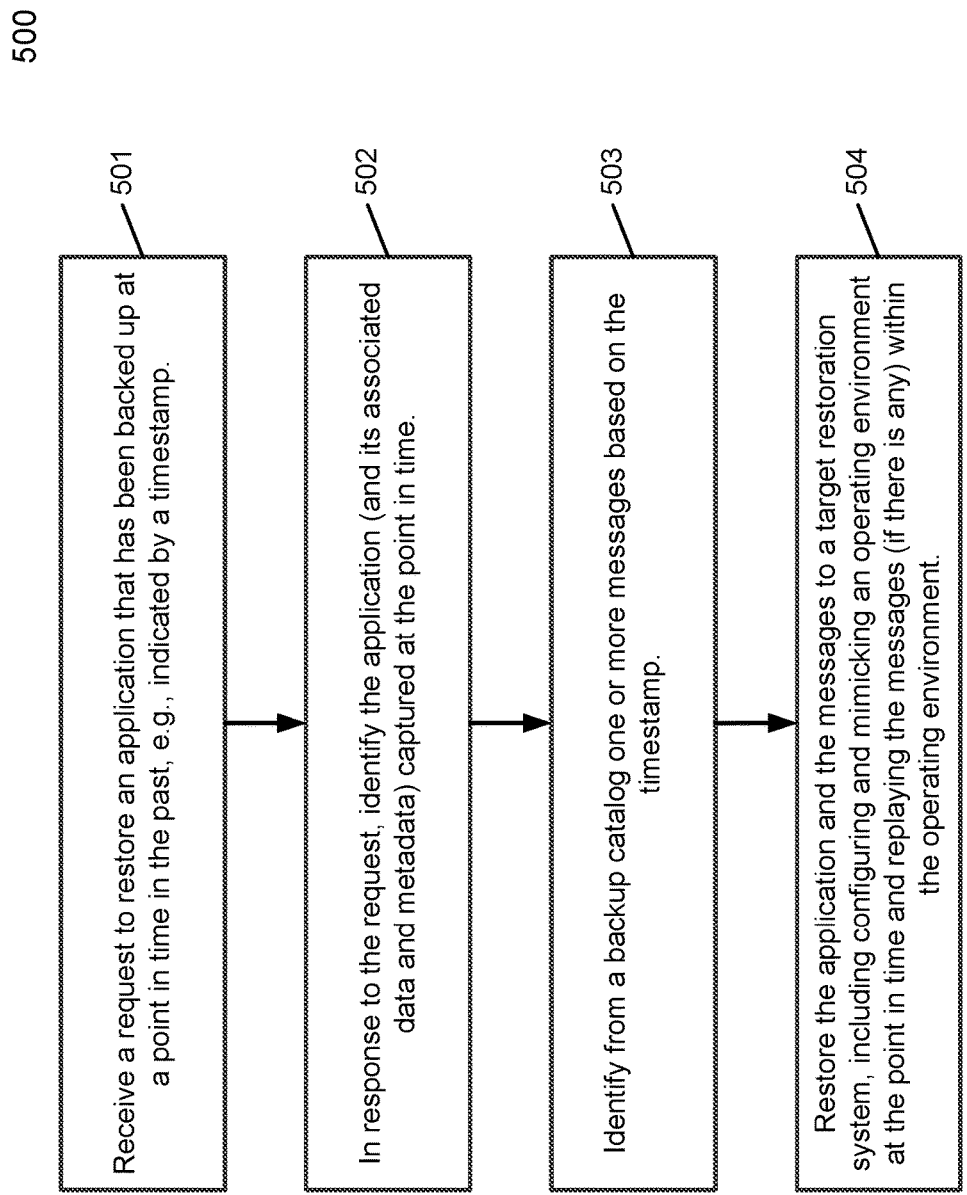
FIG. 5 is a flow diagram illustrating a process for restoring backup data according to one embodiment of the invention.

FIG. 5 is a flow diagram illustrating a process for restoring backup data according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by storage service module 106 of FIG. 1. Referring to FIG. 5, at block 501, processing logic receives a request to restore an application that was backed up at a particular point in time. At block 502, processing logic identifies the application, as well as its application data and metadata describing the application (e.g., runtime operating environment at the point in time) based on a snapshot captured at that particular environment. At block 503, processing logic identifies from a backup catalog one or more messages based on a timestamp associated with the snapshot or specified by the request. At block 504, processing logic restores the application (including its application data and the metadata) together with the identified messages to a target system. The target system establishes and configures an operating environment based on the metadata, for example, in a virtual machine, which mirrors the actual runtime environment at that particular point in time. The application is then executed, the application data is loaded to be accessible by the executed application, and the messages are resent or replayed.

Note that some or all of the components as shown and described above (e.g., backup agent 122 of FIG. 1A) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
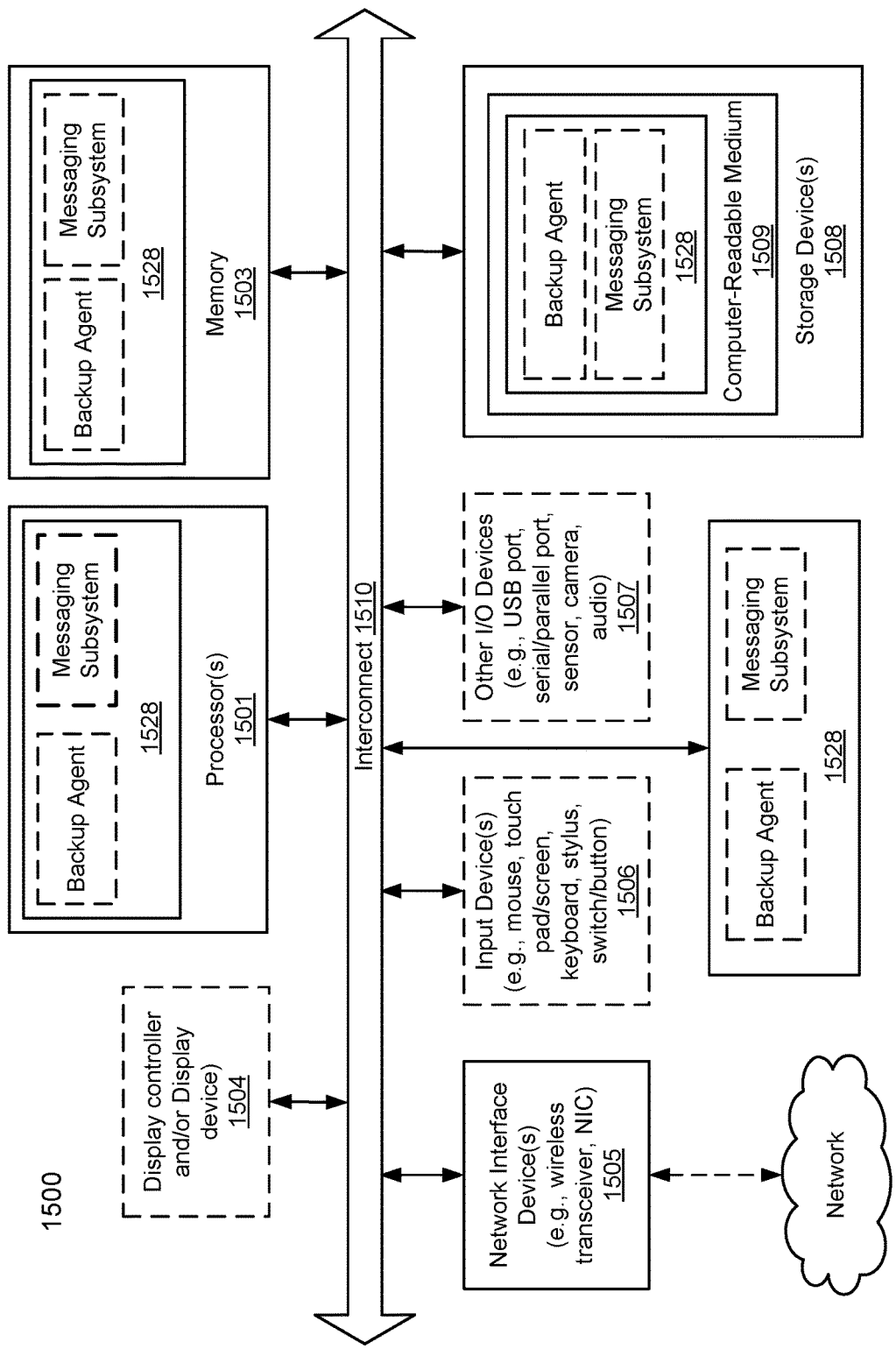
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for backing up messages of a messaging system associated with an application, the method comprising: receiving a first message from a first application hosted by a first host system and executed by a processor, the first message to be sent to a second application; transparently intercepting, by a backup agent hosted by the first host system, the first message; transmitting, by the backup agent hosted by the first host system, the first message to a backup storage system that is associated with the first application and is remote from the first host system, wherein the first message is backed up at the backup storage system, and wherein the backup storage system is communicatively coupled to the first host system over a network; and forwarding by the backup agent the first message to a first messaging application instance of a messaging sub-system associated with the first application, wherein the messaging sub-system is to send the first message to a second messaging application instance of the messaging sub-system associated with the second application using a predetermined messaging protocol.

2. The method of claim 1, wherein the second application is hosted by a second host system, and wherein the backup storage system further stores backup application data associate with the first application.

3. The method of claim 1, further comprising:
creating a first entry corresponding to the first message in a backup catalog, the backup catalog includes a plurality of entries, each entry recording a specific instance of a message that has been backed up in the backup storage system; and
recording metadata of the first message in the first entry, including a timestamp of the first message initiated by the first application.

4. The method of claim 3, further comprising:
receiving by the backup agent a second message that is forwarded from a first messaging application instance;
locating the first entry in the catalog based on the second message; and
setting a message state attribute in the first entry to indicate that the first message has been read by the second application.

5. The method of claim 4, further comprising forwarding the second message to the first application, wherein the second message is received from the second application as an acknowledgement to the first message.

6. The method of claim 4, wherein in response to a request to restore application data of the first application of a particular point in time, a restore module of the backup storage system is to perform restore operations, the restore operations including identifying a backup instance of the application data of the first application corresponding to that particular point in time,
identifying one or more messages that were exchanged during a time period corresponding to the point in time,
restoring the application data and the identified one or messages to a target restore system.

7. The method of claim 6, wherein the restore operations further comprise:
for each of the identified messages, examining a corresponding message entry in the backup catalog to determine whether the message has been read by a receiver of the message; and
restoring the message only if the message has not been read by the receiver of the message indicated in the message entry.

8. The method of claim 1, wherein the predetermined messaging protocol is compatible with an advanced message queuing protocol (AMQP).

9. A non-transitory machine-readable medium having instructions stored therein, which when executed by a processor, cause the processor to perform operations of backup and restore of messages, the operations comprising:
receiving a first message from a first application hosted by a first host system, the first message to be sent to a second application;
transparently intercepting, by a backup agent hosted by the first host system, the first message;
transmitting, by the backup agent hosted by the first host system, the first message to a backup storage system that is associated with the first application and is remote from the host system, wherein the first message is backed up at the backup storage system, and wherein the backup storage system is communicatively coupled to the first host system over a network; and
forwarding the first message to a first messaging application instance of a messaging sub-system associated with the first application, wherein the messaging sub-system is to send the first message to a second messaging application instance of the messaging sub-system associated with the second application using a predetermined messaging protocol.

10. The non-transitory machine-readable medium of claim 9, wherein the second application is hosted by a second host system, and wherein the backup storage system further stores backup application data associate with the first application.

11. The non-transitory machine-readable medium of claim 9, wherein the operations further comprise:
creating a first entry corresponding to the first message in a backup catalog, the backup catalog includes a plurality of entries, each entry recording a specific instance of a message that has been backed up in the backup storage system; and
recording metadata of the first message in the first entry, including a timestamp of the first message initiated by the first application.

12. The non-transitory machine-readable medium of claim 11, wherein the operations further comprise:
receiving by the backup agent a second message that is forwarded from a first messaging sub-system;
locating the first entry in the catalog based on the second message; and
setting a message state attribute in the first entry to indicate that the first message has been read by the second application.

13. The non-transitory machine-readable medium of claim 12, wherein the operations further comprise forwarding the second message to the first application, wherein the second message is received from the second application as an acknowledgement to the first message.

14. The non-transitory machine-readable medium of claim 12, wherein in response to a request to restore application data of the first application of a particular point in time, a restore module of the backup storage system is to perform restore operations, the restore operations including
identifying a backup instance of the application data of the first application corresponding to that particular point in time,
identifying one or more messages that were exchanged during a time period corresponding to the point in time,
restoring the application data and the identified one or messages to a target restore system.

15. The non-transitory machine-readable medium of claim 14, wherein the restore operations further comprise:
for each of the identified messages, examining a corresponding message entry in the backup catalog to determine whether the message has been read by a receiver of the message; and
restoring the message only if the message has not been read by the receiver of the message indicated in the message entry.

16. The non-transitory machine-readable medium of claim 9, wherein the predetermined messaging protocol is compatible with an advanced message queuing protocol (AMQP).

17. A data processing system, comprising:
a processor; and
a backup agent hosted by a first host system and executed by the processor to perform operations, the operations including
receiving a first message from a first application hosted by the first host system, the first message to be sent to a second application,
transparently intercept the first message,
transmitting the first message to a backup storage system that is associated with the first application and is remote from the first host system, wherein the first message is backed up at the backup storage system, and wherein the backup storage system is communicatively coupled to the first host system over a network, and
forwarding the first message to a first messaging application instance of a messaging sub-system associated with the first application, wherein the messaging sub-system is to send the first message to a second messaging application instance of the messaging sub-system associated with the second application using a predetermined messaging protocol.

18. The system of claim 17, wherein the second application is hosted by a second host system, and wherein the backup storage system further stores backup application data associate with the first application.

19. The system of claim 17, wherein the operations further comprise:
creating a first entry corresponding to the first message in a backup catalog, the backup catalog includes a plurality of entries, each entry recording a specific instance of a message that has been backed up in the backup storage system; and
recording metadata of the first message in the first entry, including a timestamp of the first message initiated by the first application.

20. The system of claim 19, wherein the operations further comprise:
- receiving by the backup agent a second message that is forwarded from a first messaging sub-system;
- locating the first entry in the catalog based on the second message; and
- setting a message state attribute in the first entry to indicate that the first message has been read by the second application.

21. The system of claim 20, wherein the operations further comprise forwarding the second message to the first application, wherein the second message is received from the second application as an acknowledgement to the first message.

22. The system of claim 20, wherein in response to a request to restore application data of the first application of a particular point in time, a restore module of the backup storage system is to perform restore operations, the restore operations including
- identifying a backup instance of the application data of the first application corresponding to that particular point in time,
- identifying one or more messages that were exchanged during a time period corresponding to the point in time,
- restoring the application data and the identified one or messages to a target restore system.

23. The system of claim 22, wherein the restore operations further comprise:
- for each of the identified messages, examining a corresponding message entry in the backup catalog to determine whether the message has been read by a receiver of the message; and
- restoring the message only if the message has not been read by the receiver of the message indicated in the message entry.

24. The system of claim 17, wherein the predetermined messaging protocol is compatible with an advanced message queuing protocol (AMQP).

* * * * *